United States Patent
Poikselka (10) Patent No.: US 9,848,020 B2
(45) Date of Patent: Dec. 19, 2017

(54) USER PLANE CONTROL IN IMS

(75) Inventor: Miikka Juhana Poikselka, Espoo (FI)

(73) Assignee: Nokia Solutions and Networks Oy, Espoo (FI)

(*) Notice: Subject to any disclaimer, the term of this patent is extended or adjusted under 35 U.S.C. 154(b) by 57 days.

(21) Appl. No.: 12/738,911

(22) PCT Filed: Sep. 23, 2008

(86) PCT No.: PCT/EP2008/062683
§ 371 (c)(1),
(2), (4) Date: Apr. 20, 2010

(87) PCT Pub. No.: WO2009/053194
PCT Pub. Date: Apr. 30, 2009

(65) Prior Publication Data
US 2010/0211686 A1    Aug. 19, 2010

(51) Int. Cl.
*H04L 29/06* (2006.01)

(52) U.S. Cl.
CPC ................ *H04L 65/1069* (2013.01)

(58) Field of Classification Search
USPC ......................................................... 709/227
See application file for complete search history.

(56) References Cited

U.S. PATENT DOCUMENTS

| | | | | |
|---|---|---|---|---|
| 2005/0233727 A1* | 10/2005 | Poikselka et al. | ......... | 455/404.2 |
| 2007/0180119 A1* | 8/2007 | Khivesara et al. | ........... | 709/226 |
| 2007/0232301 A1* | 10/2007 | Kueh | ................... | H04W 8/082 |
| | | | | 455/433 |
| 2008/0004061 A1* | 1/2008 | Takeda | ........................ | 455/518 |

FOREIGN PATENT DOCUMENTS

| | | |
|---|---|---|
| EP | 1816789 A | 8/2007 |
| WO | WO02102107 A | 12/2002 |

OTHER PUBLICATIONS

Gonzalo Camarillo, Miguel A. Garcia-Martin: "The 3G IP Multimedia Subsystem (IMS) Merging the Internet and the Cellular Worlds" 2004, John Wiley & Sons, Ltd. , XP002468136 ISBN: 978-0-470-87156-0 * Chapter 3.4.7 * Chapter 5.6, p. 115-125 * Chapter 7.6.1 * Chapter 7.6.2 * Chapter 11 * figure 5.6 * * figure 5.19 * * figure 5.29 * * figure 11.1 *.

Garcia-Martin Ericsson E Henrikson Lucent D Mills Vodafone M: "Private Header (P-Header) Extensions to the Session Initiation Protocol (SIP) for the 3rd-Generation Partnership Project (3GPP); rfc3455.txt;" IETF Standard, Internet Engineering Task Force, IETF, CH, Jan. 2003 (Jan. 2003), XP015009238 ISSN.

"3rd Generation Partnership Project; Technical Specification Group Services and System Aspects; IP Multimedia Subsystem (IMS); Stage 2 (Release 6); 3GPP TS 23.228" ETSI Standards, European Telecommunications Standards Institute, Sophia-Antipo, FR, vol. 3-SA2, No. V641, 2004, XP014029177.

(Continued)

*Primary Examiner* — Angela Nguyen
(74) *Attorney, Agent, or Firm* — Harrington & Smith (57) ABSTRACT

From a user a request for a session is received. Information on an access network via which the request is received is determined. A media type or an application requested in the request is determined. A decision on media path handling is made based on the information on the access network determined and the media type or the application determined.

25 Claims, 9 Drawing Sheets

(56) References Cited

OTHER PUBLICATIONS

"3$^{rd}$ Generation Partnership Project; Technical Specification Group Services and System Aspects; Voice Call Continuity between CS and IMS Study (Release 7)", 3GPP TR 23.806 V7.0.0, Dec. 2005, 153 pgs.

"3$^{rd}$ Generation Partnership Project; Technical Specification Group Services and System Aspects; System enhancements for the use of IMS services in local breakout and optimal routing of media (Release 8)", 3GPP TR 23.894, Oct. 2007, 11 pgs.

* cited by examiner

USER PLANE CONTROL IN IMS

FIELD OF THE INVENTION

The present invention relates to user plane/media path control in an IP (Internet Protocol) Multimedia Subsystem (IMS). In particular, the present invention relates to IMS controlled local breakout.

BACKGROUND OF THE INVENTION

In IMS, users get their IP connectivity either from a home network or a visited network while users are roaming.

A UE (User Equipment) accessing IMS services requires an IP address that is logically part of the IMS IP Addressing Domain. This is established using an appropriate IP Connectivity Access Network (IP-CAN) bearer. Example of IP-CAN bearer is PDP (Packet Data Protocol) context of GPRS system. In GPRS system it is possible to connect to a GGSN (Gateway GPRS (General Packet Radio Service) Support Node) either in the VPLMN (Visited Public Land Mobile Network) or the HPLMN (Home Public Land Mobile Network). For routing efficiency this context may benefit from being connected through a GGSN in the visited network. The connection between the UE and the IMS (where the GGSN is either in the Home or the Visited network) is shown in FIGS. 1 and 2.

Figure 1:
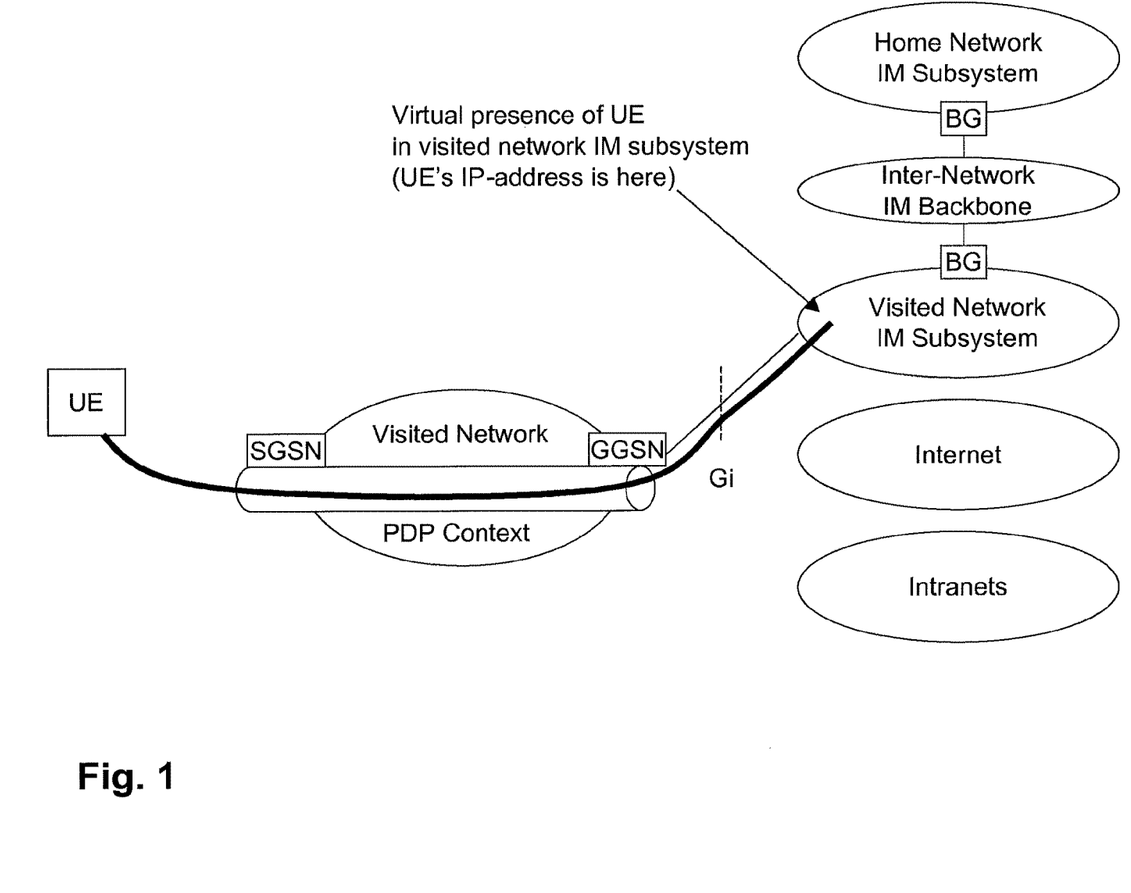
FIG. 1 shows a schematic diagram illustrating a UE accessing IM subsystem services with GGSN in a visited network.
Figure 2:
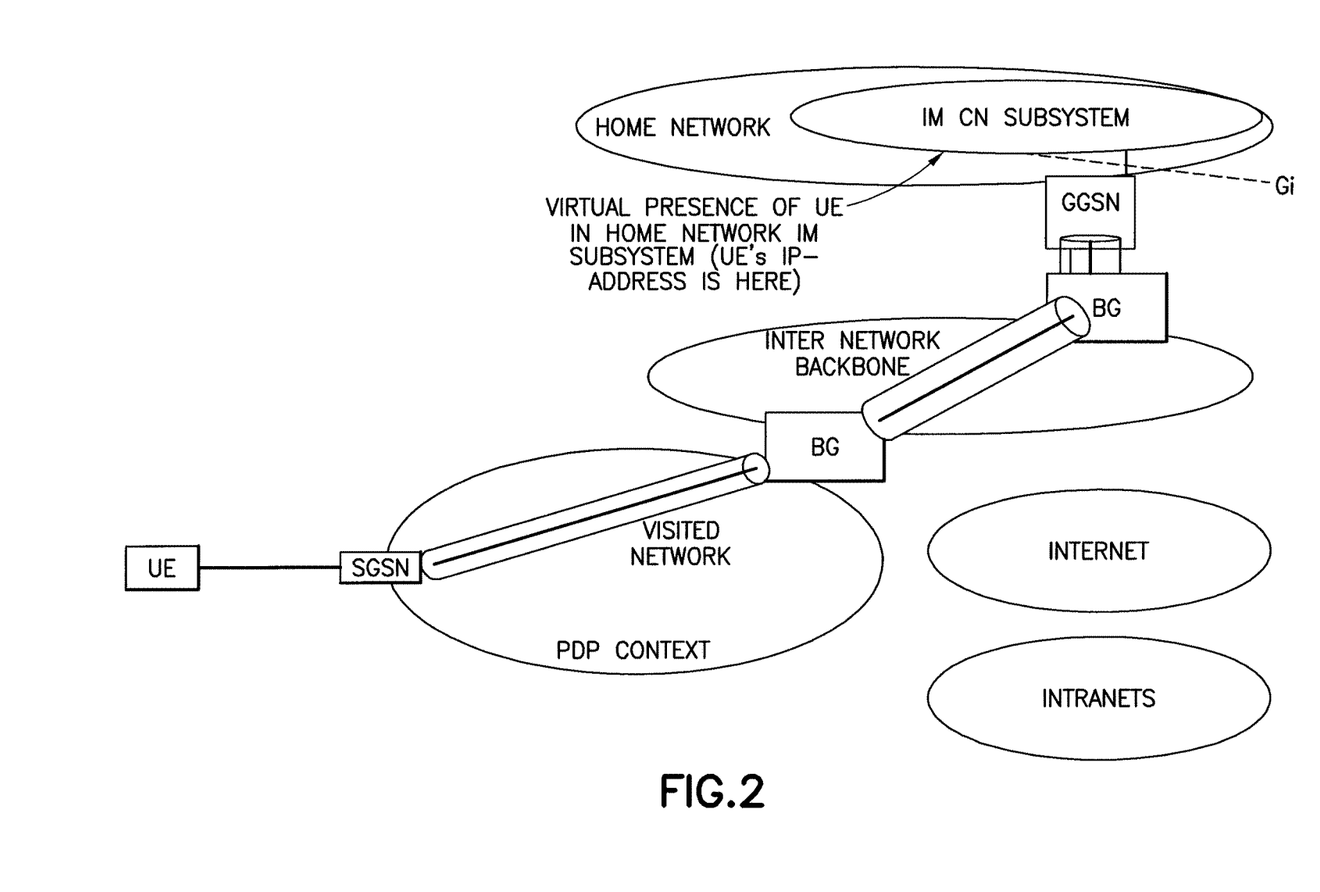
FIG. 2 shows a schematic diagram illustrating a UE accessing IM CN subsystem services with GGSN in a home network.

FIG. 1 shows the UE accessing IMS services with GGSN in the visited network, and FIG. 2 shows the UE accessing IMS services with GGSN in the home network.

Currently, users are able to choose either attach to visited P-CSCF (Proxy Call Session Control Function) or home P-CSCF, but not both at the same time. When a UE registers to its point of connection via visited P-CSCF to its home network the used roaming network is also checked and the operator of the home network is able to decide whether the user is allowed to roam to the visited network or not. Once registration is successfully completed, the UE in the visited network is allowed to perform a so called local breakout which is a network capability where user plane (media path) in a roaming case is not required to traverse via the home network, i.e. a user plane termination point is at the visited network.

For example, in the GPRS system shown in FIGS. 1 and 2, the GGSN of the visited network would be used for local breakout in FIG. 1.

In IMS, operators have capability to control which media are allowed for their users. Different IMS entities such as P-CSCF and S-CSCF (Serving CSCF) are able to inspect proposed media capabilities in SIP (Session Initiation Protocol) session setup procedures. If the proposed media capabilities are against operator policy and/or subscriber's user profile, IMS entities are able to reject a session attempt with SIP error response.

SUMMARY OF THE INVENTION

The present invention aims at improving control for IMS user plane resource usage.

According to an aspect of the invention a serving entity is provided which comprises a receiving unit configured to receive from a user a request for a session, a first determining unit configured to determine information on an access network via which the request is received, a second determining unit configured to determine a media type or an application requested in the request, and a deciding unit configured to decide on media path handling based on the information on the access network determined by the first determining unit and the media type or the application determined by the second determining unit.

According to another aspect of the invention, a communication device is provided which comprises a transmitting unit configured to transmit a request for a session via a proxy entity via which the communication device is registered, using an access type, a receiving unit configured to receive an instruction to connect via another proxy entity and/or another access type, and a processing unit configured to perform connection via said another proxy entity and/or said another access type.

According to a further aspect of the invention, a method is provided which comprises receiving from a user a request for a session, determining information on an access network via which the request is received, determining a media type or an application requested in the request, and deciding on media path handling based on the information on the access network determined and the media type or the application determined.

According to a still further aspect of the invention, a method for a communication device is provided, the method comprising transmitting a request for a session via a proxy entity via which the communication device is registered, using an access type, receiving an instruction to connect via another proxy entity and/or another access type, and performing connection via said another proxy entity and/or said another access type.

According to an embodiment of the invention, when a serving entity, e.g. an S-CSCF, receives a request for a session, a proxy entity, e.g. a P-CSCF, is determined via which the request is received. In doing so it is found out whether the proxy entity is in a home network of a user or in a visited network, i.e. if the user is currently roaming in a visited network. IOI (Inter Operator Identifier) can be used for the determination.

In addition, a requested media type and/or application is determined. The media type is in the received request and comprises e.g. voice call, video sharing, game, etc. The S-CSCF may detect the requested media type and/or the application from Session Description Protocol (SDP) payload encapsulated in a SIP request.

Based on the above determined information, i.e. roaming or not and media type, media path handling is decided. Media path handling means a decision whether a user should connect via P-CSCF of visited/roaming network or via P-CSCF of the home network.

When receiving the request by the S-CSCF it may be further determined if the user is registered via alternative/multiple P-CSCFs, i.e. P-CSCFs in home and visited networks. This is then taken into account in the decision on the media path handling.

Moreover, in the decision on the media path handling for the request, operator or service provider policy may be used which may be configured in the S-CSCF. In addition to operator or service provider policy subscriber specific policy may be used at the S-CSCF as included in the subscriber's user profile.

The S-CSCF may instruct the user to connect via an alternative P-CSCF (home/visited) if based on the decision on the media path handling the request was received via a non-appropriate (e.g. not optimal, not according to policy) P-CSCF.

According to an embodiment of the invention, the decision on media path handling is made per session, based on:
1. information on whether the user is roaming or not;
2. media type of the session; and 3. knowledge of possible other P-CSCFs via which the user is registered.

According to the invention, local breakout is enabled not only by using visited P-CSCF, and local breakout can be controlled on session basis by an entity of a home network.

According to a further embodiment of the invention, when the serving entity receives a request for a session, alternatively or in addition to determining the proxy entity, an access type, e.g. UMTS, WLAN, xDSL or WiMAX, is determined via which the request is received. With this embodiment of the invention, in addition to enforcing which breakout to use (home or visited) it is possible that an operator enforces which access technology is used to setup the request.

Thus, with the present invention, the following advantages can be achieved:
1. a serving entity such as an S-CSCF is enabled to enforce user plane control (local breakout);
2. SIP signalling means are provided to request use of an alternative user plane/P-CSCF;
3. subscriber's user profile is extended to cover local breakout policy;
4. the S-CSCF is enabled to enforce correct media/application use per access network technology; and
5. SIP signalling means are provided to request use of an alternative access network for a particular request.

The invention enables more granular control for IMS user plane resource usage. This is enabled by an IMS entity (e.g. S-CSCF) for controlling signalling and user plane traffic, wherein a decision of the IMS entity may be signalled to a UE.

According to an embodiment of the invention, a home network entity disallows local breakout and requests a device to use home network connection instead of visited connection. The invention also provides the device which supports this functionality.

Alternatively, the home network entity of the invention may force local breakout and request the device to use visited network connection instead of home connection.

The home network entity of the invention may also disallow local breakout for certain media when the device is roaming, and may force traffic via home network for specific sessions or media within a session.

In contrast, according to the prior art, when a device is roaming and registered, a home network entity can only generally allow local breakout or home breakout.

For example, the functionality of the present invention can be adopted in certain operator situations. Some operators may not want to allow certain applications/media while a device is roaming and want to get traffic routed home, e.g. for performing transcoding or operator specific user plane procedures.

For the purpose of the present invention to be described herein below, it should be noted that a device or user equipment may for example be any device by means of which a user may access a communication network; this implies mobile as well as non-mobile devices and networks, independent of the technology platform on which they are based; only as an example, it is noted that terminals operated according to principles standardized by the 3$^{rd}$ Generation Partnership Project 3GPP and known for example as UMTS terminals are particularly suitable for being used in connection with the present invention;

method steps likely to be implemented as software code portions and being run using a processor at one of the user equipment or network entities are software code independent and can be specified using any known or future developed programming language;

method steps and/or devices likely to be implemented as hardware components at one of the user equipment or network entities are hardware independent and can be implemented using any known or future developed hardware technology or any hybrids of these, such as MOS, CMOS, BiCMOS, ECL, TTL, etc, using for example ASIC components or DSP components, as an example;

generally, any method step is suitable to be implemented as software or by hardware without changing the idea of the present invention;

devices or entities can be implemented as individual devices, but this does not exclude that they are implemented in a distributed fashion throughout the system, as long as the functionality of the device is preserved.

DESCRIPTION OF THE INVENTION

In the following the invention will be described by way of embodiments thereof taking into account the accompanying drawings.

At first IMS breakout logic in an IMS entity, e.g. an S-CSCF, will be described.

The S-CSCF determines a roaming status of a user equipment (UE) e.g. from an Inter Operator Identifier (IOI) received during registration of the user equipment.

The Inter Operator Identifier (IOI) is a globally unique identifier to share between sending and receiving networks, service providers or content providers. A sending network populates an orig-ioi parameter of a P-Charging-Vector header in a request and thereby identifies an operator network from which the request originated. A term-ioi parameter is left out of the P-Charging-Vector header in this request. The sending network retrieves the term-ioi parameter from the P-Charging-Vector header within a message sent in response, which identifies an operator network from which the response was sent.

A receiving network retrieves the orig-ioi parameter from the P-Charging-Vector header in the request, which identifies the operator network from which the request originated. The receiving network populates the term-ioi parameter of the P-Charging-Vector header in a response to the request, which identifies the operator network from which the response was sent.

For example, an IOI is exchanged between a P-CSCF (possibly in a visited network) and an S-CSCF in a home network in REGISTER requests and responses.

Thus, the S-CSCF can recognize that a received request/response is coming from a UE via a particular P-CSCF (i.e. home or visited P-CSCF) and if the UE is going to use local breakout capabilities or not. An incoming request/response also contains information on desired application and/or media. The S-CSCF may also recognize if the UE is registered via multiple P-CSCFs.

Together with operator's policy and/or subscriber specific policy, local breakout decision logic at the S-CSCF can be formed as follows:
1. determination whether user is roaming;
2. determination whether media/application are allowed via proposed signalling and user plane option;
3. decision on media path handling based on 1 and 2.
Moreover, in the decision it can be considered if the UE is registered via multiple P-CSCFs.

Figure 3:
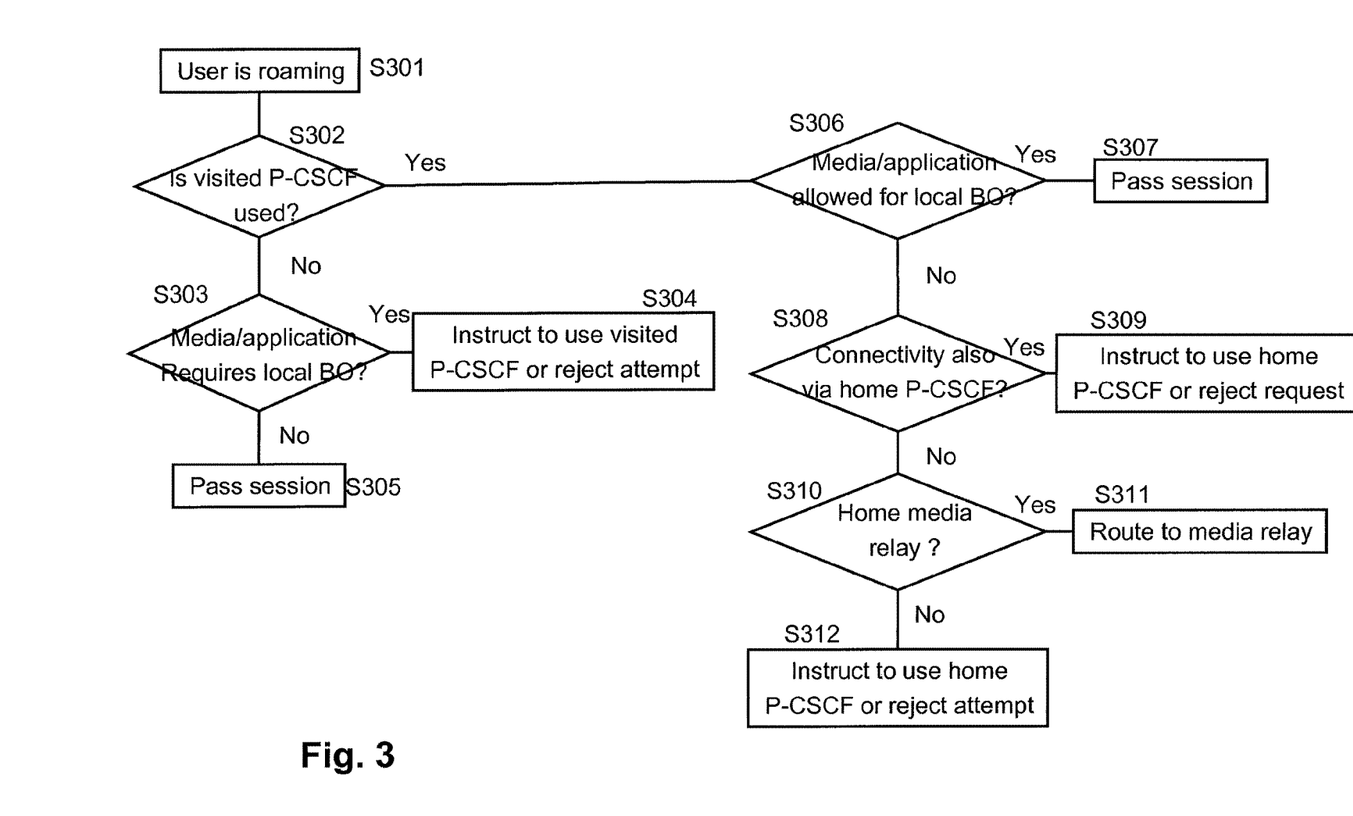
FIG. 3 shows a flow chart illustrating IMS breakout procedure according to an embodiment of the invention.

FIG. 3 shows a flow chart illustrating IMS breakout procedure according to an embodiment of the invention.

In step S301 an S-CSCF which has received a request for a session from a user of a UE determines that the user is roaming which may be done based on an IOI received in a registration message issued from the UE via a P-CSCF. In other words, when the S-CSCF determines that the registration is received via a visited P-CSCF, the S-CSCF knows that the UE is roaming.

During registration, the S-CSCF may store various information for later use, such as information about access network where UE/P-CSCF is located, e.g. IOI, name/address of P-CSCF(s) via which the UE registers, etc.

In step S302 the S-CSCF determines whether the session request has been received via the visited P-CSCF. This can also be done based on an IOI received in the session request. Alternatively or in addition, the S-CSCF may use the information stored already during the registration procedure of the user.

If the session request has not been received via the visited P-CSCF, in step S303 it is determined whether media/application requested in the session request requires a local breakout (BO). In case the determination is affirmative, in step S304 the S-CSCF instructs the UE to use the visited P-CSCF, or rejects the session request. If the media/application does not require local breakout, in step S305 the S-CSCF passes the session request.

In case the session request has been received via the visited P-CSCF, in step S306 it is determined whether the media/application is allowed for local breakout. If the determination is affirmative, in step S307 the S-CSCF passes the session request.

If the media/application is not allowed for local breakout, the flow proceeds to step S308 where it is determined whether the UE has connectivity also via a home P-CSCF. If the determination is affirmative, in step S309 the S-CSCF instructs the UE to use the home P-CSCF, or rejects the session request.

In case there is no connectivity via a home P-CSCF, the flow proceeds to step S310 where it is determined whether there is a home media relay. If the determination is affirmative, in step S311 routing to media relay may be performed in accordance with an operator option to speed up session setup by placing its node between originator (its roaming user) and the terminating party without rejecting request first/instructing to use alternative connection. In doing so, session setup time is optimized as the operator takes actions without involving the originating UE.

If there is no home media relay, the flow proceeds to step S312 where the S-CSCF instructs the UE to use the home P-CSCF or rejects the session request.

It is to be noted that the determination steps S302, S303, S306, S308 and S310 can be ordered differently or some steps may be omitted, e.g. step 306 may lead directly to S309 or S312. The table below shows examples of possible decisions according to the IMS breakout procedure shown in FIG. 3.

| Roaming status and request status | Media/application | Operator policy | Current P-CSCF options | Decision |
| --- | --- | --- | --- | --- |
| Yes, request via home P-CSCF | Voice | Local breakout to be used if registration via the visited P-CSCF exist | Registration via home and visited P-CSCF | Instruct to use visited P-CSCF |
| Yes, request via home P-CSCF | Game | Home breakout | Registration via home and visited P-CSCF | Pass |
| Yes, request via visited P-CSCF | Video sharing | Home breakout to be used | Registration via visited P-CSCF | Instruct to use home P-CSCF |

Figure 4:
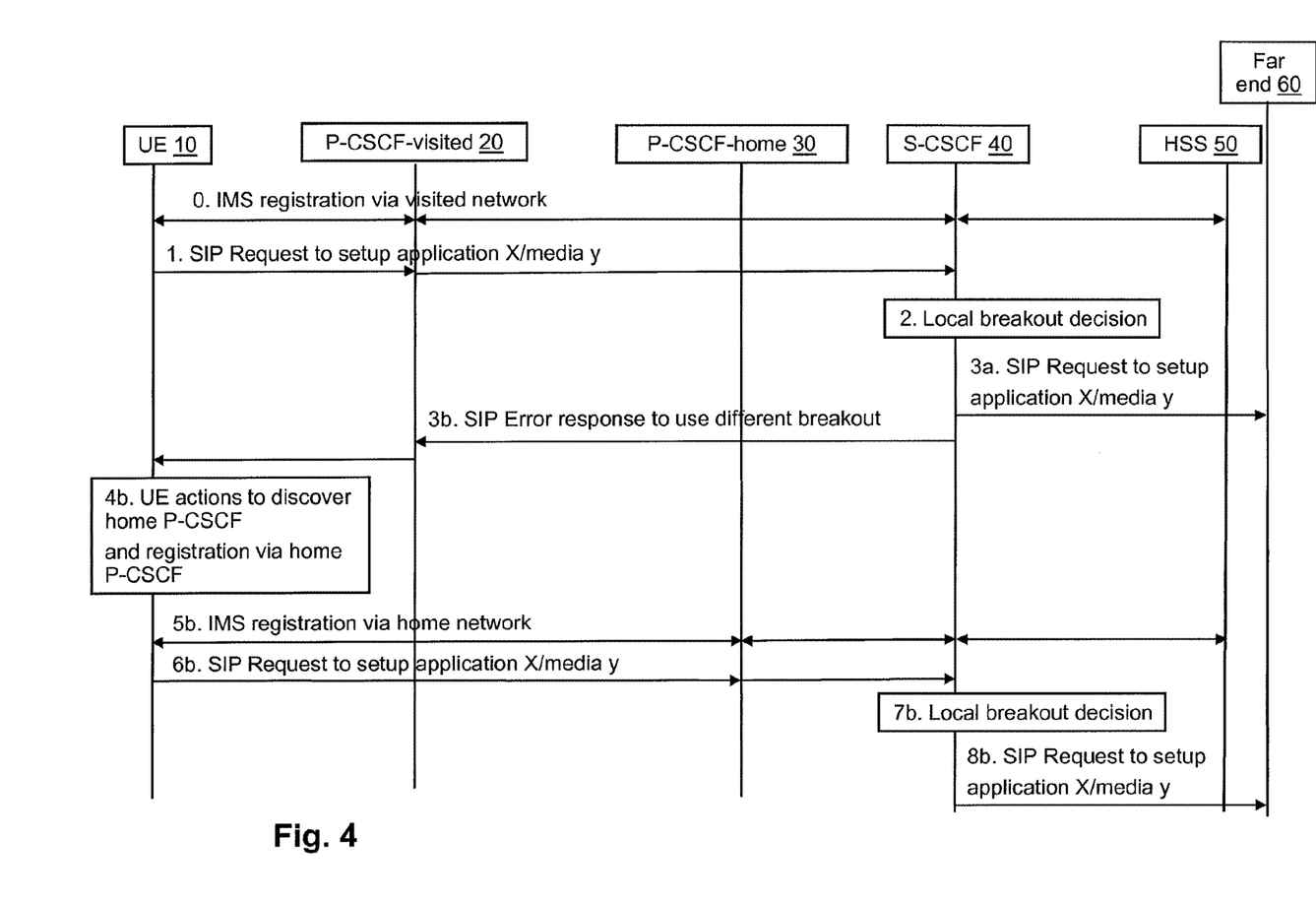
FIG. 4 shows a signalling diagram illustrating signalling according to an embodiment of the invention.

FIG. 4 shows a signalling diagram illustrating signalling between a UE 10, a visited P-CSCF 20, a home P-CSCF 30, an S-CSCF 40, an HSS (Home Subscriber Server) 50 and a far end 60, according to an embodiment of the invention. According to FIG. 4, the UE 10 is registered via a visited network and attempts to initiate service via the visited network. Decision is made at the S-CSCF 40. FIG. 4 shows what kind of actions could be taken by the S-CSCF 40, i.e. let the request pass or instruct the UE 10 to make connection via the home network.

In a communication 0 in FIG. 4 IMS registration via the visited network is performed between the UE 10, the visited P-CSCF 20, the S-CSCF 40 and the HSS 50.

In communication 1 in FIG. 4 a SIP request to setup application X/media Y is issued by the UE 10 and received by the S-CSCF 40 via the visited P-CSCF 20. In block 2 in FIG. 4 the S-CSCF 40 performs a local breakout decision in accordance with the breakout procedure of the present invention as described above.

In case the S-CSCF 40 decides that the session request should proceed with the proposed signalling and user plane option, i.e. the visited P-CSCF 20, it passes the SIP request to the far end 60 in communication 3a in FIG. 4. However, if the S-CSCF 40 decides that the session request cannot proceed with the visited P-CSCF 20, it sends a SIP error response to use different breakout to the UE 10 via the visited P-CSCF 20 in communication 3b in FIG. 4.

In block 4b in FIG. 4, the UE 10 performs actions to discover its home P-CSCF 30, and performs registration via the home P-CSCF 30. In communication 5b in FIG. 4, the UE 10 performs IMS registration via the home network between the UE 10, the home P-CSCF 30, the S-CSCF 40 and the HSS 50.

In communication 6b in FIG. 4, the S-CSCF 40 receives a SIP request to setup application X/media Y from the UE 10 via the home P-CSCF 30, and performs a local breakout decision in block 7b in FIG. 4. Since now the proposed signalling and user plane option complies with the result of the local breakout decision, the SIP request is passed to the far end 60 in communication 8b in FIG. 4.

Figure 5:
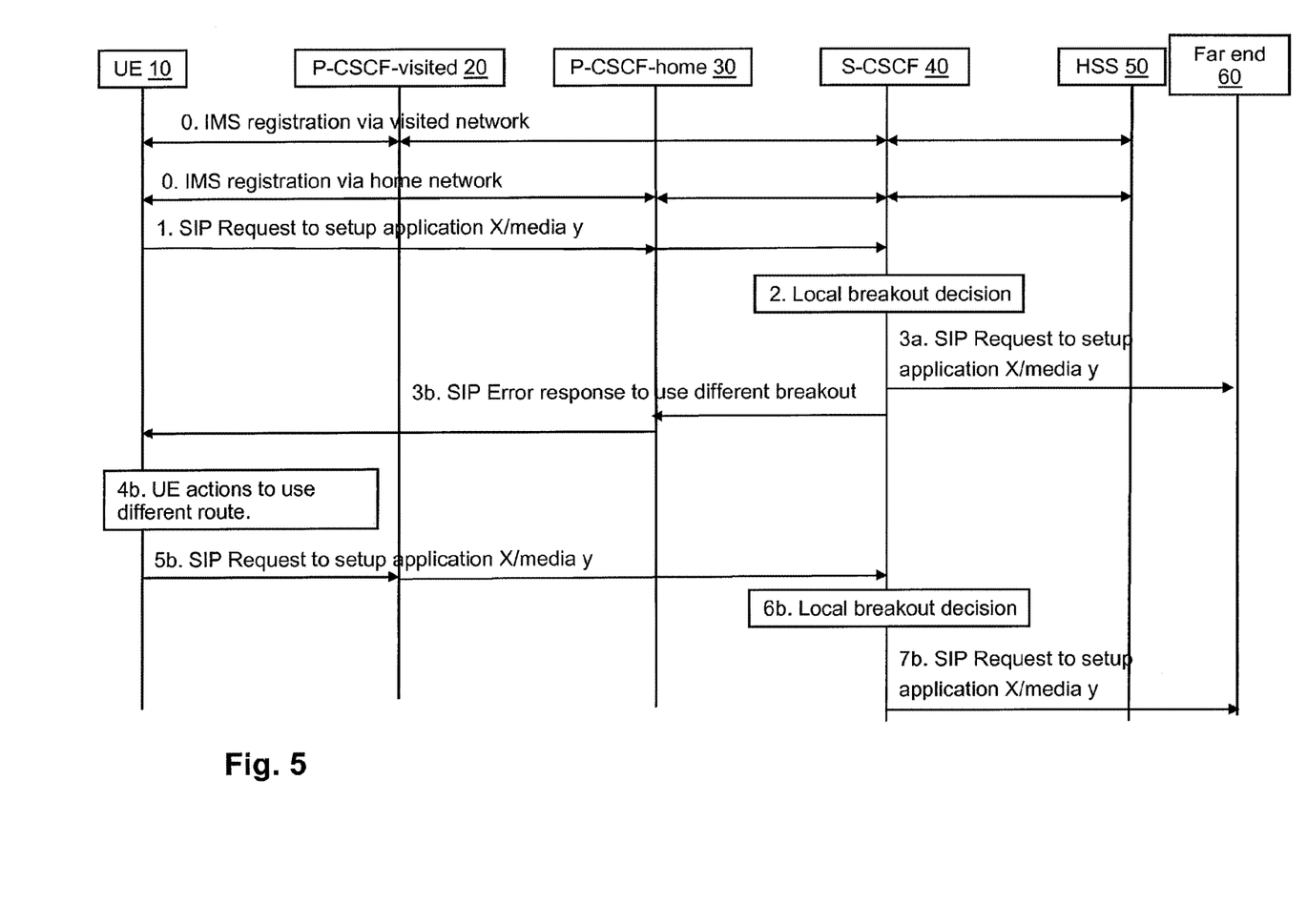
FIG. 5 shows a signalling diagram illustrating signalling according to an embodiment of the invention.

FIG. 5 shows a signalling diagram illustrating signalling between the UE 10, the visited P-CSCF 20, the home P-CSCF 30, the S-CSCF 40, the HSS 50 and the far end 60, when the UE 10 is registered via both visited network and home network. The UE 10 attempts to initiate service via the home network. Decision is made at the S-CSCF 40. FIG. 5 shows what kind of actions could be taken by the S-CSCF, i.e. let the request pass or instruct the UE 10 to make connection via the visited network.

In a first communication 0 in FIG. 5 IMS registration via the visited network is performed between the UE 10, the visited P-CSCF 20, the S-CSCF 40 and the HSS 50.

In addition, in a second communication 0 in FIG. 5 IMS registration via the home network is performed between the UE 10, the home P-CSCF 30, the S-CSCF 40 and the HSS 50.

In communication 1 in FIG. 5 a SIP request to setup application X/media Y is issued by the UE 10 and received by the S-CSCF 40 via the home P-CSCF 30. In block 2 in FIG. 5 the S-CSCF 40 performs a local breakout decision in accordance with the breakout procedure of the present invention as described above.

In case the S-CSCF 40 decides that the session request should proceed with the proposed signalling and user plane option, i.e. the home P-CSCF 30, it passes the SIP request to the far end 60 in communication 3a in FIG. 5. However, if the S-CSCF 40 decides that the session request cannot proceed with the home P-CSCF 30, it sends a SIP error response to use different breakout to the UE 10 via the home P-CSCF 30 in communication 3b in FIG. 5.

In block 4b in FIG. 5, the UE 10 performs actions to use a different route. In communication 5b in FIG. 5, the S-CSCF 40 receives a SIP request to setup application X/media Y from the UE 10 via the visited P-CSCF 20, and performs a local breakout decision in block 6b in FIG. 5. Since now the proposed signalling and user plane option complies with the result of the local breakout decision, the SIP request is passed to the far end 60 in communication 7b in FIG. 5.

In the following, signalling procedures to request the UE to use other connectivity option will be described.

When the S-CSCF has decided not to allow connection to be established it may send an instruction to the UE/user how connection could be established instead. This may be achieved by attaching appropriate information to SIP error response when the network entity (the S-CSCF) blocks a SIP request. There are several possibilities to send this type of error response from the S-CSCF to the UE. For example:

a) Using SIP 305 Use Proxy Response:

Contact field of 305 response contains globally standardized URI (Uniform Resource Identifier) pointing either to visited network or home network. The URI may be for instance visited.ims.3gppnetwork.org and home.ims.3gppnetwork.org. The key point is that the given string is known to the UE and it can take necessary actions based on the received information.

It is to be noted that it may not be sufficient that the S-CSCF provides the known alternative P-CSCF contact address to the UE (when the UE has dual registration via home and visited networks). It is expected that the contact the P-CSCF provides to the S-CSCF during registration cannot always be assumed to be the same as the address the UE has discovered during P-CSCF discovery.

If it can be assumed that the contact address of the P-CSCF stored in the S-CSCF after the registration equals with the contact address of the P-CSCF discovered by the UE during P-CSCF discovery phase, the S-CSCF may give the required P-CSCF contact address in the contact field of 305 Use Proxy response to the UE.

b) Using SIP 380 Alternative Service Response:

i) With a specialized XML (eXtended Markup Language) body which indicates that home/visited P-CSCF should be used instead. The specialized body may be an XML body contained element for local breakout (e.g. true/false or visited/home).

ii) With an XML element (e.g. localbreakout=true/false breakout=visited/home) in the existing IMS XML body.

c) Using SIP 488 Not Acceptable Here Response with Information to Use Visited or Home Network, e.g. in Accept-Header or Similar Header.

In the following subscriber specific local breakout policy information will be described.

Figure 6:
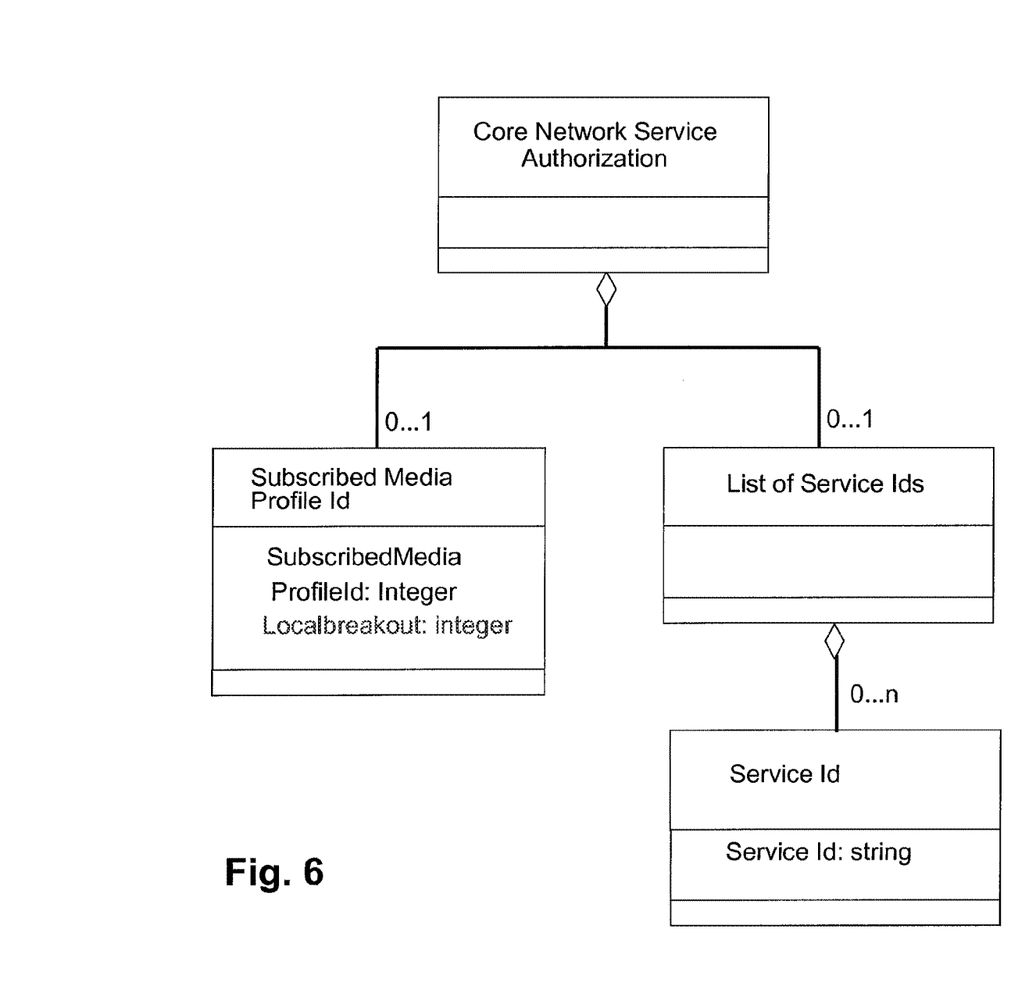
FIG. 6 shows a schematic diagram illustrating an arrangement of breakout policy information according to an embodiment of the invention.
Figure 7:
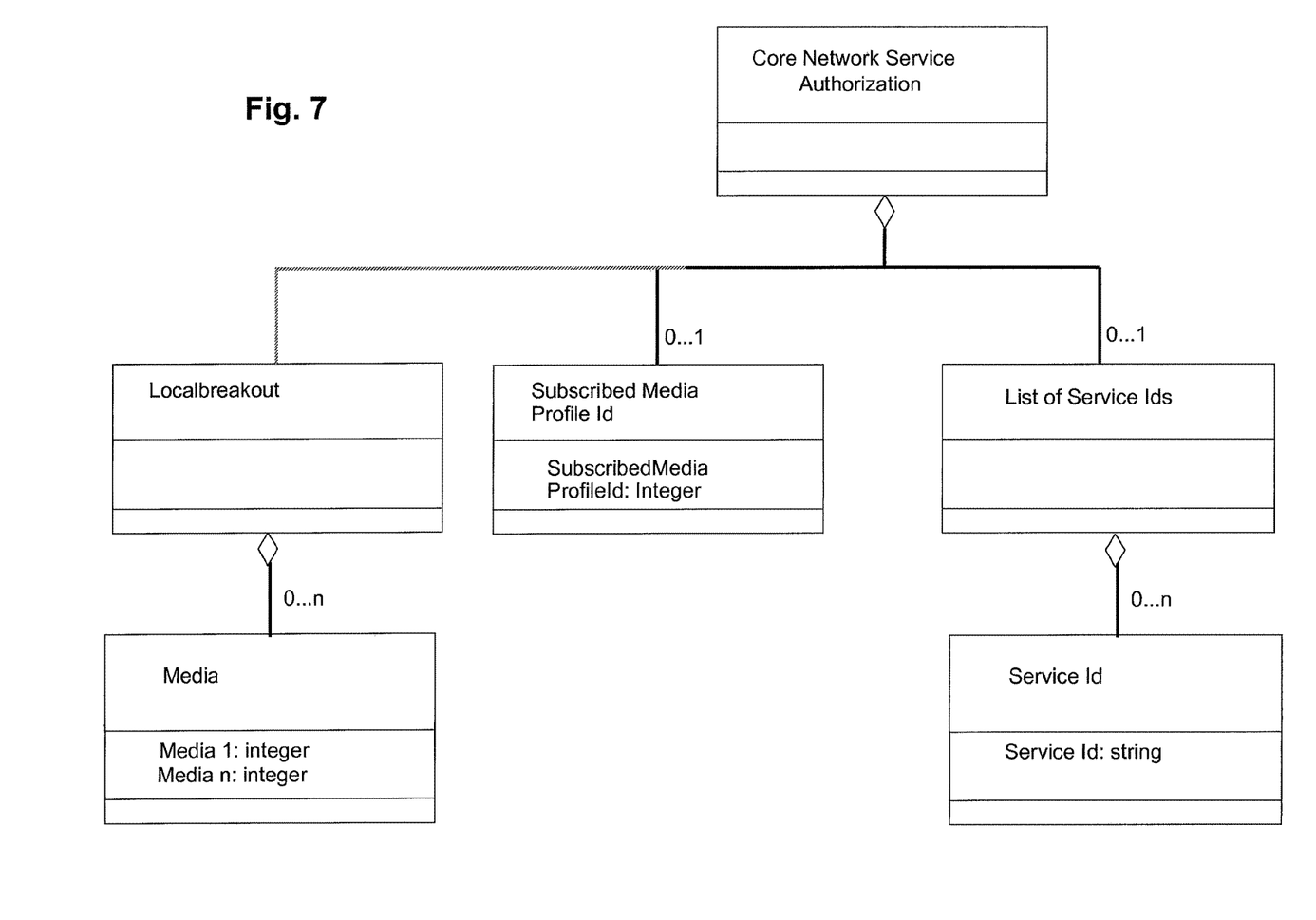
FIG. 7 shows a schematic diagram illustrating an arrangement of breakout policy information according to an embodiment of the invention.

If local breakout policy is a subscriber specific feature then policy should be part of subscriber's user profile stored in HSS. In this case, the Cx reference point between S-CSCF and HSS is modified. Core Network Service Authorization class is extended with local breakout policy information. This can be done in several ways. FIGS. 6 and 7 show two examples.

As shown in FIG. 6, local breakout policy information is part of Subscribed Media Profile Id under the Core Network Service Authorization class. The entry in the Subscribed Media Profile Id is e.g. "localbreakout: integer", where a value '0' indicates that local breakout is not allowed and value '1' indicates that local breakout is allowed.

Alternatively, the entry may be "localbreakout: string", and string has e.g. values of 'yes'/'no'.

As shown in FIG. 7, the local breakout policy information forms a class "Localbreakout" under Core Network Service Authorization class. It may further contain one or more instances of media class "Media". The media class may contain one or more media/application specific policies for local breakout. Value of media may be encoded as string or integer as described in the example shown in FIG. 6.

In the following a further embodiment of the invention will be described.

In addition to inspecting which P-CSCF is used to send a request, the S-CSCF may also support policy to determine which access network is used to send the request. An operator may have certain policies that certain applications are only allowed via specific access(es). For example, Push to talk Over Cellular is only allowed via UMTS (Universal Mobile Telecommunications System) access and Voice over IP is allowed via WLAN (Wireless Local Area Network), xDSL (any Digital Subscriber Line) or WiMAX (Worldwide Interoperability for Microwave Access) accesses. In order to decide on an incoming request, the S-CSCF needs to know which access type is used to initiate the request and what is operator's policy regarding certain access types. For example, access types may comprise GPRS, UMTS, WLAN, xDSL, WiMAX, or the like. As additional criteria for making a decision the S-CSCF may use knowledge of registration information.

Once the S-CSCF realizes that a certain application is not allowed to use an intended access network or intended type of access network, the S-CSCF may reject the request and instruct the UE to setup the request via an alternative (type of) access network. The S-CSCF may reject the request with a proper SIP error response. For example, SIP 380 Alternative Service response with specific body or new element in an existing IMS XML body may be used, or SIP 488 Not Acceptable Here response with proper information to use alternative access type e.g. in accept-header or similar header may be used.

Figure 8:
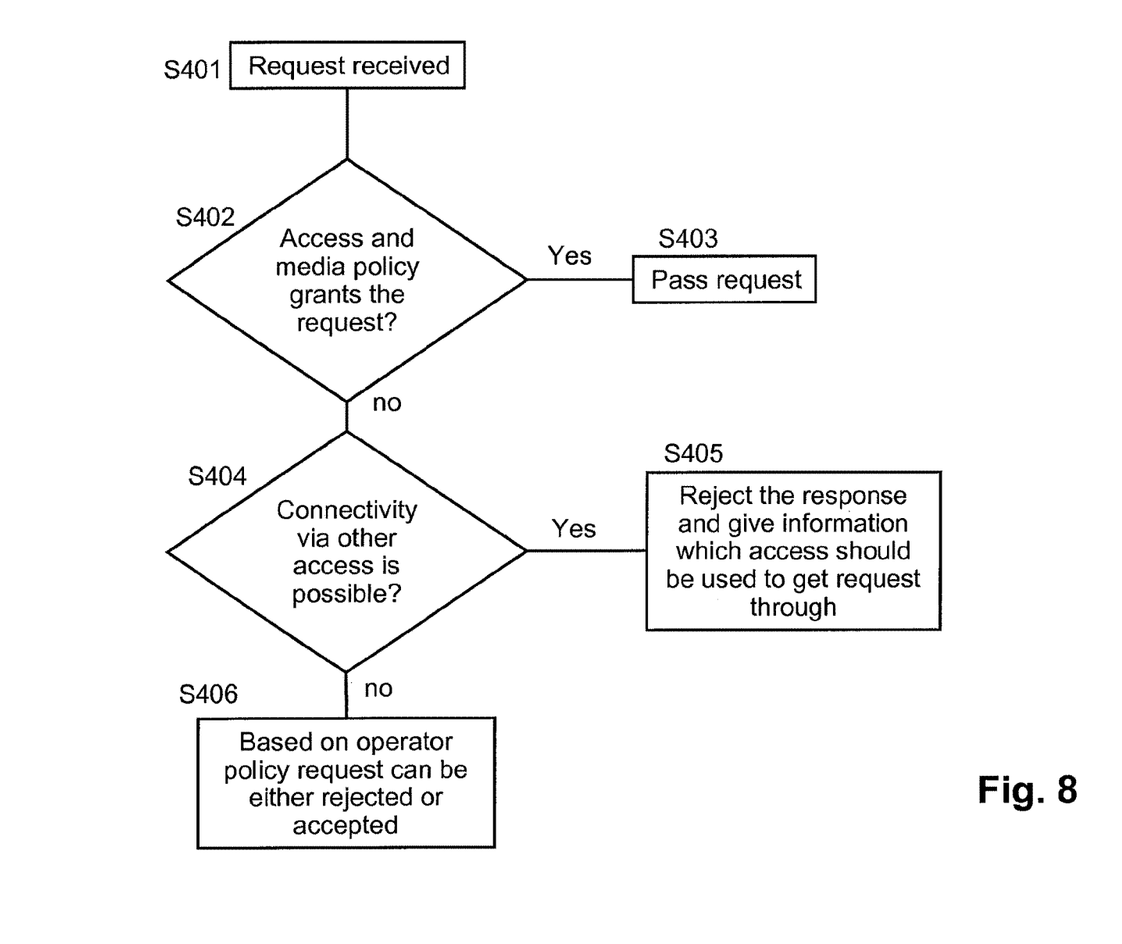
FIG. 8 shows a flow chart illustrating a procedure according to a further embodiment of the invention.

FIG. 8 shows a flow chart illustrating the procedure according to this embodiment. In step S401 an S-CSCF receives a request for a session from a user of a UE.

In step S402 the S-CSCF determines which access type is used to setup this request e.g. by using information derived from inspecting content of P-Access-Network-Info header. In addition it determines what media and/or application(s) is requested by using information derived from inspecting from Session Description Protocol (SDP) payload encapsulated in a SIP request or content of SIP headers. The S-CSCF compares the extracted information against operator's policy and/or subscriber's specific policy in order to determine if media/application(s) is allowed via the used access network (type).

If the session request is allowed due to policy, in step 403 the S-CSCF passes the session request.

In case the session request is not allowed, in step S404 it can be determined whether the media/application(s) is allowed via any other access networks or access network types. If the determination is affirmative, in step S405 the S-CSCF rejects the request and provides information to the UE which access networks or access network types may be used to re-send the request.

In case the media/application(s) are not allowed in other access networks or access network types either, in step S406 operator specific handling is executed. For example, the S-CSCF may reject the request with appropriate error response or operator may pass the request.

Figure 9:
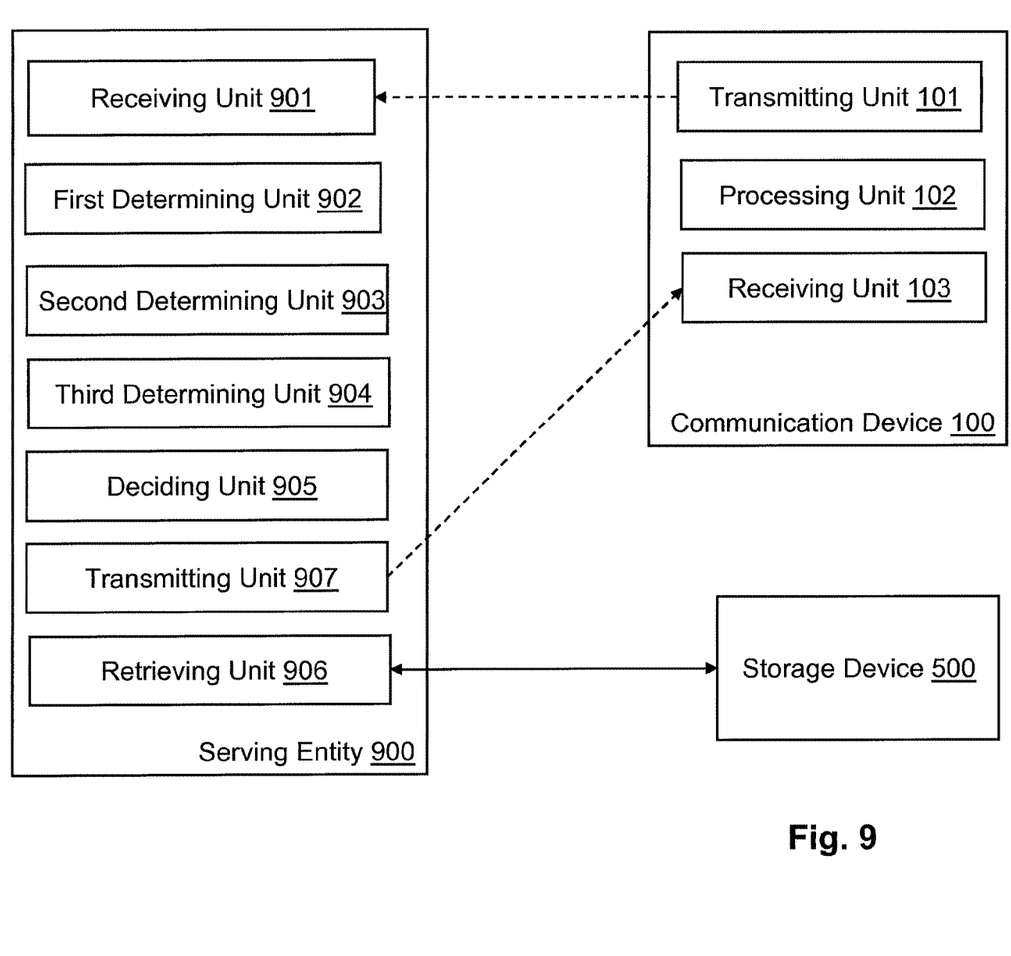
FIG. 9 shows a schematic block diagram illustrating a serving entity and a communication device according to an embodiment of the invention.

FIG. 9 shows a schematic block diagram illustrating a serving entity 900 and a communication device 100 according to an embodiment of the invention. The serving entity 900 may be an S-CSCF, and the communication device 100 may be a user equipment.

The serving entity 900 comprises a receiving unit 901, a first determining unit 902, a second determining unit 903 and a deciding unit 905. The serving entity 900 may further comprise a third determining unit 904, a retrieving unit 906 and a transmitting unit 907.

The communication device 100 comprises a transmitting unit 101, a processing unit 102 and a receiving unit 103.

The receiving unit 901 of the serving entity 900 receives from a user a request for a session. For example, the request may have been transmitted by the transmitting unit 101 of the communication device 100 via a proxy entity via which the communication device is registered, using an access type.

The first determining unit 902 determines information on an access network via which the request is received, and the second determining unit 903 determines a media type or an application requested in the request. Based on the information on the access network determined by the first determining unit 902 and the media type or the application determined by the second determining unit 903, the deciding unit 905 decides on media path handling.

The information determined by the first determining unit 902 may comprise information on a proxy entity via which the request is received and/or information on an access type via which the request is received.

The first determining unit 902 may determine the information based on information received during registration procedure of the user.

The first determining unit 902 may determine if the proxy entity via which the request is received is located in a home network of the user or in a visited network. This determination may be done based on Inter Operator Identifier.

The first determining unit 902 may determine the access type based on a P-Access-Network-Info header of session initiation protocol.

The second determining unit 903 may determine the media type or application from Session Description Protocol parameter in the request.

The deciding unit 905 may decide on media path handling by deciding whether the proxy entity and/or the access type via which the request is received is optimal/allowed for the media type or the application.

The third determining unit 904 may determine whether the user is registered also via another proxy entity. Based on this determination result, the deciding unit 905 may decide on the media path handling.

The deciding unit 905 may decide on the media path handling in accordance with policy information comprising at least one of operator, service provider and subscriber specific data.

The retrieving unit 906 may retrieve the policy information from a database, e.g. a storage device 500, storing data for the user.

In case the deciding unit 905 decides that the media path handling is to be done via another proxy entity different from the proxy entity determined by the first determining unit 902 and/or via another access type different from the access type determined by the first determining unit 902, the deciding unit is configured to cause the transmitting unit 907 to send an instruction to the user to connect via the another proxy entity and/or via the another access type.

The receiving unit 103 of the communication device 100 may receive the instruction to connect via the another proxy entity and/or the another access type, and the processing unit 102 may perform connection via the another proxy entity and/or the another access type.

It is to be noted that the serving entity and communication device shown in FIG. 9 may have further functionality for working e.g. as S-CSCF and user equipment. Here the functions of the serving entity and communication device relevant for understanding the principles of the invention are described using blocks as shown in FIG. 9. The arrangement of the blocks of the serving entity and communication device is not construed to limit the invention, and the functions may be performed by one block or further split into sub-blocks.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A serving entity comprising:
   a receiving unit configured to receive from a user a request for a session;

a first determining unit configured to determine information on an access network via which the request is received;
a second determining unit configured to determine a media type or an application requested in the request; and
a deciding unit configured to decide on media path handling based on both:
(a) the information on the access network determined by the first determining unit; and
(b) the media type or the application determined by the second determining unit,
wherein the deciding on media path handling comprises an IP (Internet Protocol) Multimedia Subsystem (IMS) local breakout decision.

2. The serving entity of claim 1, wherein the information determined by the first determining unit comprises information on a proxy entity via which the request is received and/or information on an access type via which the request is received.

3. The serving entity of claim 1, wherein the first determining unit is configured to determine the information based on information received during registration procedure of the user.

4. The serving entity of claim 1, wherein the second determining unit is configured to determine the media type or application from Session Description Protocol parameter in the request.

5. The serving entity of claim 1, wherein the deciding unit is configured to decide on the media path handling in accordance with policy information comprising at least one of operator, service provider and subscriber specific data.

6. The serving entity of claim 2, wherein the first determining unit is configured to determine if the proxy entity via which the request is received is located in a home network of the user or in a visited network.

7. The serving entity of claim 2, wherein the first determining unit is configured to determine the access type based on a P-Access-Network-Info header of session initiation protocol.

8. The serving entity of claim 2, wherein the deciding unit is configured to decide on media path handling by deciding whether the proxy entity and/or the access type via which the request is received is optimal/allowed for the media type or the application.

9. The serving entity of claim 2, comprising:
a third determining unit configured to determine whether the user is registered also via another proxy entity,
wherein the deciding unit is configured to decide on the media path handling based on the determination result by the third determining unit.

10. The serving entity of claim 2, comprising:
a transmitting unit,
wherein, if the deciding unit decides that the media path handling is to be done via another proxy entity different from the proxy entity determined by the first determining unit and/or via another access type different from the access type determined by the first determining unit, the deciding unit is configured to cause the transmitting unit to send an instruction to the user to connect via said another proxy entity and/or via said another access type.

11. The serving entity of claim 6, wherein the first determining unit is configured to determine if the proxy entity is located in the home network of the user or in the visited network based on Inter Operator Identifier.

12. The serving entity of claim 5, comprising:
a retrieving unit configured to retrieve the policy information from a database storing data for the user.

13. A communication device comprising one or more processors and one or more memories including computer program code, the one or more memories and the computer program code configured, with the one or more processors, to cause the communication device to perform at least the following:
transmit a request for a session via a proxy entity with which the communication device is registered, wherein the proxy entity is located in one of a home network of a user and a visited network;
receive a SIP error response to use an alternative proxy entity in response to the transmit of the request for the session; and
perform connection via another proxy entity located in the other one of the home network of the user and the visited network.

14. A method comprising:
receiving from a user a request for a session;
determining information on an access network via which the request is received;
determining a media type or an application requested in the request; and
deciding on media path handling based on both:
(a) the information on the access network determined; and
(b) the media type or the application determined,
wherein the deciding on media path handling comprises an IP (Internet Protocol) Multimedia Subsystem (IMS) local breakout decision.

15. The method of claim 14, wherein the information determined comprises information on a proxy entity via which the request is received and/or information on an access type via which the request is received.

16. The method of claim 14, comprising:
determining the information based on information received during registration procedure of the user.

17. The method of claim 14, comprising:
determining the media type or application from Session Description Protocol parameter in the request.

18. The method of claim 15, comprising:
determining if the proxy entity via which the request is received is located in a home network of the user or in a visited network.

19. The method of claim 15, comprising:
determining the access type based on a P-Access-Network-Info header of session initiation protocol.

20. The method of claim 15, comprising:
deciding on media path handling by deciding whether the proxy entity and/or the access type via which the request is received is optimal/allowed for the media type or the application.

21. The method of claim 15, comprising:
determining whether the user is registered also via another proxy entity; and
deciding on the media path handling based on the determination result.

22. The method of claim 15, comprising:
deciding that the media path handling is to be done via another proxy entity different from the proxy entity determined and/or via another access type different from the access type determined; and
transmitting an instruction to the user to connect via said another proxy entity and/or via said another access type.

23. The method of claim 18, comprising:
    determining if the proxy entity is located in the home network of the user or in the visited network based on Inter Operator Identifier.

24. A method for a communication device, the method comprising:
    transmitting a request for a session via a proxy entity via which the communication device is registered, wherein the proxy entity is located in one of a home network of a user and a visited network;
    receiving a SIP error response to use an alternative proxy entity in response to the transmitting of the request for the session; and
    performing connection via another proxy entity located in the other one of the home network of the user and the visited network.

25. A non-transitory computer-readable medium storing a program for causing a processing device to execute the method of claim 14.

\* \* \* \* \*